United States Patent
Li et al.

(10) Patent No.: US 12,355,701 B2
(45) Date of Patent: Jul. 8, 2025

(54) ACQUIRING CHANNEL STATE INFORMATION

(71) Applicant: ZTE CORPORATION, Guangdong (CN)

(72) Inventors: Yong Li, Shenzhen (CN); Hao Wu, Shenzhen (CN); Zhaohua Lu, Shenzhen (CN); Guozeng Zheng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 352 days.

(21) Appl. No.: 17/886,580

(22) Filed: Aug. 12, 2022

(65) Prior Publication Data
US 2023/0040085 A1    Feb. 9, 2023

Related U.S. Application Data

(63) Continuation of application No. PCT/CN2020/075087, filed on Feb. 13, 2020.

(51) Int. Cl.
*H04L 5/00* (2006.01)
*H04B 7/06* (2006.01)

(52) U.S. Cl.
CPC ......... *H04L 5/0051* (2013.01); *H04B 7/0626* (2013.01); *H04B 7/063* (2013.01)

(58) Field of Classification Search
CPC ..... H04L 5/0051; H04L 5/0007; H04L 5/005; H04L 5/0016; H04B 7/0626; H04B 7/063; H04B 7/0632
See application file for complete search history.

(56) References Cited

U.S. PATENT DOCUMENTS

| | | | |
|---|---|---|---|
| 2017/0201307 A1* | 7/2017 | Kim | H04B 7/04 |
| 2019/0215113 A1 | 7/2019 | Cha et al. | |

FOREIGN PATENT DOCUMENTS

| | | |
|---|---|---|
| CN | 103891380 A | 6/2014 |
| CN | 105684323 A | 6/2016 |
| CN | 108370266 A | 8/2018 |
| EP | 3 567 967 A1 | 11/2019 |
| WO | WO-2011/013989 A2 | 2/2011 |

OTHER PUBLICATIONS

Extended European Search Report for EP Appl. No. 20888458.5, dated May 15, 2023.
Qualcomm Incorporated, "Text proposals on CSI-RS", 3GPP TSG RAN WG1 Meeting AH 1801, R1-1800862, Jan. 26, 2018, Vancouver, Canada (9 pages).
International Search Report and Written Opinion for PCT Appl. No. PCT/CN2020/075087 mailed Nov. 16, 2020. (8 pages).
(Continued)

*Primary Examiner* — Ayanah S George
(74) *Attorney, Agent, or Firm* — Foley & Lardner LLP

(57) ABSTRACT

Presented are systems and methods for acquiring channel state information. A wireless communicate node may transmit a channel state information reference signal (CSI-RS) to a wireless communication device via a first antenna port of a plurality of antenna ports of the wireless communication node. The wireless communication node may receive a channel state information (CSI) report from the wireless communication device.

19 Claims, 3 Drawing Sheets

(56) References Cited

OTHER PUBLICATIONS

Samsung: "Remaining details on CSI-RS" R1-1717629, 3GPP TSG RAN WGI Meeting 90bis, Oct. 13, 2017, Prague, CZ (10 pages).
Dandan, C. et al., "Massive MIMO Technology Standard Progress and Development for 5G New Radio", Designing Techniques of Posts and Telecommunications, Radio Communication, Nov. 2018 (5 pages).
ETRI, "CSI-RS enhancements for EBF/FD-MIMO", 3GPP TSG RAN WG1 Meeting #80, R1-150518, Feb. 13, 2015, Athens, Greece (4 pages).
First Office Action for CN Appl. No. 202080082173.6, dated Jul. 15, 2024 (with English translation, 14 pages).

* cited by examiner

ACQUIRING CHANNEL STATE INFORMATION

CROSS-REFERENCE TO RELATED APPLICATION

This application claims the benefit of priority under 35 U.S.C. § 120 as a continuation of PCT Patent Application No. PCT/CN2020/075087, filed on Feb. 13, 2020, the disclosure of which is incorporated herein by reference in its entirety.

TECHNICAL FIELD

The disclosure relates generally to wireless communications, including but not limited to systems and methods for enhancing channel state information on multiple transmission/reception points.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communicate node may transmit a channel state information reference signal (CSI-RS) to a wireless communication device via a first antenna port of a plurality of antenna ports of the wireless communication node. The wireless communication node may receive a channel state information (CSI) report from the wireless communication device.

In some embodiments, the first antenna port may be identified from the plurality of antenna ports according to a code division multiplexed (CDM) group and a CDM code sequence for transmitting the CSI-RS. In some embodiments, the first antenna port may be identified from the plurality of antenna ports according to an identification of a resource block for transmitting the CSI-RS.

In some embodiments, the first antenna port may be identified from the plurality of antenna ports according to an identification of a resource block, a code division multiplexed (CDM) group and a CDM code sequence for transmitting the CSI-RS. In some embodiments, the CSI report may include precoding information of the first antenna port, and the first antenna port may be identified from the plurality of antenna ports according to a type of codebook used to report the precoding information of the first antenna port.

In some embodiments, the wireless communication node may transmit configuration information to the wireless communication device. The configuration information may include a maximum number of the antenna ports that a resource of the CSI-RS can carry, and an actual number of the antenna ports for transmitting the CSI-RS. In some embodiments, the wireless communication node may transmit configuration information to the wireless communication device. The configuration information may include a maximum number of the antenna ports that a resource of the CSI-RS can carry, and an identification of the first antenna port.

In some embodiments, the CSI-RS report may include information about a precoding of the antenna ports. The precoding may include a linear combination of vectors corresponding to the antenna port. The wireless communication node may transmit configuration information to the wireless communication device. The configuration information may include a maximum number of the antenna ports in the precoding. In some embodiments, the CSI-RS report may include a first subset of the antenna ports as elements. The elements may include antenna ports in a precoding. The wireless communication node may transmit configuration information to the wireless communication device. The configuration information may include a maximum number of the antenna ports in the precoding. A number of the elements may be less than or equal to a maximum number of the antenna ports that a resource of the CSI-RS can carry, and may be less than or equal to the maximum number of the antenna ports in the precoding that is included in the configuration information.

In some embodiments, the CSI-RS report may include a subset of the first subset of the antenna elements. The subset may include antenna ports of one of a plurality of layers of the precoding. In some embodiments, the wireless communication node may transmit configuration information to the wireless communication device. The configuration information may include a range of sequence numbers of antenna ports in a precoding. The CSI-RS report may include information about the precoding. The precoding may include a linear combination of vectors corresponding to the antenna ports in the precoding.

In some embodiments, the wireless communication node may transmit configuration information to the wireless communication device. The configuration information may include a type of reporting to report a precoding. The precoding may include a wideband type, a subband type, or a type different from the wideband type and the subband type.

In some embodiments, there may be an absence of a binding relationship between resource block groups in the CSI-RS. The binding relationship may include channel coefficients of adjacent ones of the resource block groups that are expected to be continuous; or the CSI-RS is expected to use a same precoding vector on adjacent ones of the resource block groups.

In some embodiments, the wireless communication node may transmit configuration information to the wireless communication device. The configuration information may indicate whether the CSI-RS report includes an amplitude of coefficients of vectors corresponding to antenna ports in a precoding. The CSI-RS report may include information about the precoding. The precoding may include a linear combination of the vectors corresponding to the antenna ports in the precoding.

In some embodiments, the CSI-RS report may include information about the precoding. The precoding may include a linear combination of vectors corresponding to antenna ports in the precoding. A state of resources used in the transmitting of the CSI-RS report may trigger omission from the CSI-RS report of an amplitude of coefficients of the vectors corresponding to the antenna ports in the precoding.

In some embodiments, the CSI-RS report may include information about the precoding. The precoding may include a linear combination of vectors corresponding to antenna ports in the precoding, and may include a phase of coefficients of the vectors reported according to an interval in a frequency domain. An amplitude of the coefficients may be reported according to a bandwidth corresponding to an entire channel state, and the interval in the frequency domain maybe a portion of the bandwidth corresponding to the entire channel state.

At least one aspect is directed to a system, method, apparatus, or a computer-readable medium. A wireless communication device may receive a channel state information reference signal (CSI-RS) from a wireless communication node via a first antenna port of a plurality of antenna ports of the wireless communication node. The wireless communication device may transmit a channel state information (CSI) report from the wireless communication device.

In some embodiments, the first antenna port may be identified from the plurality of antenna ports according to a code division multiplexed (CDM) group and a CDM code sequence for transmitting the CSI-RS. In some embodiments, the first antenna port may be identified from the plurality of antenna ports according to an identification of a resource block for transmitting the CSI-RS.

In some embodiments, the first antenna port may be identified from the plurality of antenna ports according to an identification of a resource block, a code division multiplexed (CDM) group and a CDM code sequence for transmitting the CSI-RS. In some embodiments, the CSI report may include precoding information of the first antenna port, and the first antenna port may be identified from the plurality of antenna ports according to a type of codebook used to report the precoding information of the first antenna port.

In some embodiments, the wireless communication device may receive configuration information from the wireless communication node. The configuration information may include a maximum number of the antenna ports that a resource of the CSI-RS can carry, and an actual number of the antenna ports for transmitting the CSI-RS. In some embodiments, the wireless communication device may receive configuration information from the wireless communication node. The configuration information may include a maximum number of the antenna ports that a resource of the CSI-RS can carry, and an identification of the first antenna port.

In some embodiments, the CSI-RS report may include information about a precoding of the antenna ports. The precoding may include a linear combination of vectors corresponding to the antenna port. The wireless communication device may receive configuration information from the wireless communication node. The configuration information may include a maximum number of the antenna ports in the precoding. In some embodiments, the CSI-RS report may include a first subset of the antenna ports as elements. The elements may include antenna ports in a precoding. The wireless communication device may receive configuration information from the wireless communication node. The configuration information may include a maximum number of the antenna ports in the precoding. A number of the elements may be less than or equal to a maximum number of the antenna ports that a resource of the CSI-RS can carry, and may be less than or equal to the maximum number of the antenna ports in the precoding that is included in the configuration information.

In some embodiments, the CSI-RS report may include a subset of the first subset of the antenna elements. The subset may include antenna ports of one of a plurality of layers of the precoding. In some embodiments, the wireless communication node may transmit configuration information to the wireless communication device. The configuration information may include a range of sequence numbers of antenna ports in a precoding. The CSI-RS report may include information about the precoding. The precoding may include a linear combination of vectors corresponding to the antenna ports in the precoding.

In some embodiments, the wireless communication device may receive configuration information from the wireless communication node. The configuration information may include a type of reporting to report a precoding. The precoding may include a wideband type, a subband type, or a type different from the wideband type and the subband type.

In some embodiments, there may be an absence of a binding relationship between resource block groups in the CSI-RS. The binding relationship may include channel coefficients of adjacent ones of the resource block groups that are expected to be continuous; or the CSI-RS is expected to use a same precoding vector on adjacent ones of the resource block groups.

In some embodiments, the wireless communication device may receive configuration information from the wireless communication node. The configuration information may indicate whether the CSI-RS report includes a amplitude of coefficients of vectors corresponding to antenna ports in a precoding. The CSI-RS report may include information about the precoding. The precoding may include a linear combination of the vectors corresponding to the antenna ports in the precoding.

In some embodiments, the CSI-RS report may include information about the precoding. The precoding may include a linear combination of vectors corresponding to antenna ports in the precoding. A state of resources used in the transmitting of the CSI-RS report may trigger omission from the CSI-RS report of a amplitude of coefficients of the vectors corresponding to the antenna ports in the precoding.

In some embodiments, the CSI-RS report may include information about the precoding. The precoding may include a linear combination of vectors corresponding to antenna ports in the precoding, and may include a phase of coefficients of the vectors reported according to an interval in a frequency domain. A amplitude of the coefficients may be reported according to a bandwidth corresponding to an entire channel state, and the interval in the frequency domain maybe a portion of the bandwidth corresponding to the entire channel state.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Figure 1:
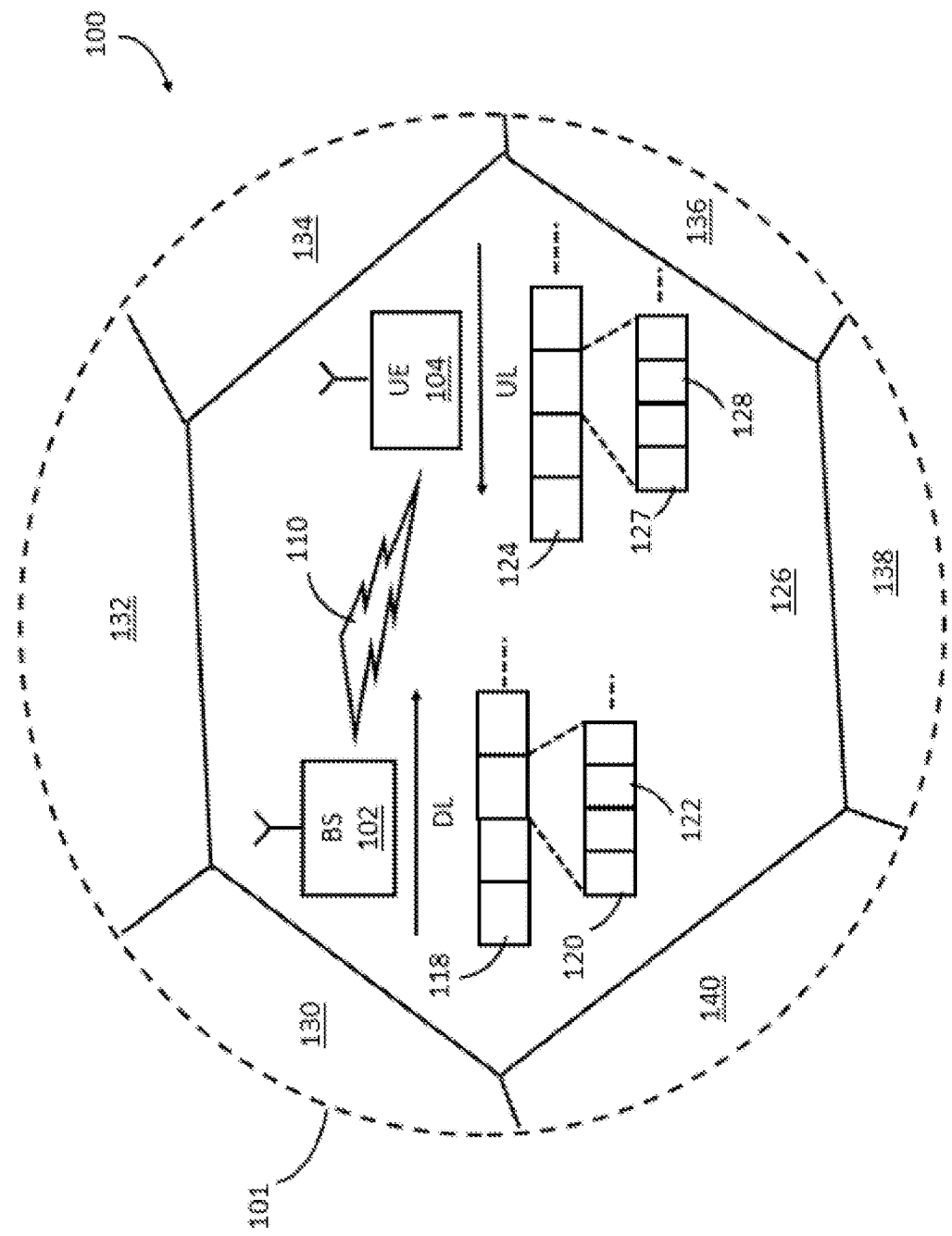
FIG. 1 illustrates an example cellular communication network in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
| --- | --- |
| 3GPP | 3rd Generation Partnership Project |
| 5G | 5th Generation Mobile Networks |
| 5G-AN | 5G Access Network |
| 5G gNB | Next Generation NodeB |
| 5G-GUTI - | Globally Unique Temporary UE Identify |
| AF | Application Function |
| AMF | Access and Mobility Management Function |
| AN | Access Network |
| ARP | Allocation and Retention Priority |
| CA | Carrier Aggregation |
| CM | Connected Mode |
| CMR | Channel Measurement Resource |
| CSI | Channel State Information |
| CQI | Channel Quality Indicator |
| CSI-RS | Channel State Information Reference Signal |
| CRI | CSI-RS Resource Indicator |
| CSS | Common Search Space |
| DAI | Downlink Assignment Index |
| DCI | Downlink Control Information |
| DL | Down Link or Downlink |
| DN | Data Network |
| DNN | Data Network Name |
| ETSI | European Telecommunications Standards Institute |
| FR | Frequency range |
| GBR | Guaranteed Bit Rate |
| GFBR | Guaranteed Flow Bit Rate |

-continued

| Acronym | Full Name |
| --- | --- |
| HARQ | Hybrid Automatic Repeat Request |
| MAC | Medium Access Control |
| MAC-CE | Medium Access Control (MAC) Control Element (CE) |
| MCS | Modulation and Coding Scheme |
| MBR | Maximum Bit Rate |
| MFBR | Maximum Flow Bit Rate |
| NAS | Non-Access Stratum |
| NF | Network Function |
| NG-RAN | Next Generation Node Radio Access Node |
| NR | Next Generation RAN |
| NZP | Non-Zero Power |
| OFDM | Orthogonal Frequency-Division Multiplexing |
| OFDMA | Orthogonal Frequency-Division Multiple Access |
| PCF | Policy Control Function |
| PDCCH | Physical Downlink Control Channel |
| PDSCH | Physical Downlink Shared Channel |
| PDU | Packet Data Unit |
| PUCCH | Physical uplink control channel |
| PMI | Precoding Matrix Indicator |
| PPCH | Physical Broadcast Channel |
| PRI | PUCCH resource indicator |
| QoS | Quality of Service |
| RAN | Radio Access Network |
| RAN CP | Radio Access Network Control Plane |
| RAT | Radio Access Technology |
| RB | Resource Block |
| RBG | Resource Block Group |
| RE | Resource Element |
| RRC | Radio Resource Control |
| RV | Redundant Version |
| SM NAS | Session Management Non Access Stratum |
| SMF | Session Management Function |
| SRS | Sounding Reference Signal |
| SS | Synchronization Signal |
| SSB | SS/PBCH Block |
| TB | Transport Block |
| TC | Transmission Configuration |
| TCI | Transmission Configuration Indicator |
| TRP | Transmission/Reception Point |
| UCI | Uplink Control Information |
| UDM | Unified Data Management |
| UDR | Unified Data Repository |
| UE | User Equipment |
| UL | Up Link or Uplink |
| UPF | User Plane Function |
| USS | UE Specific Search Space |

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
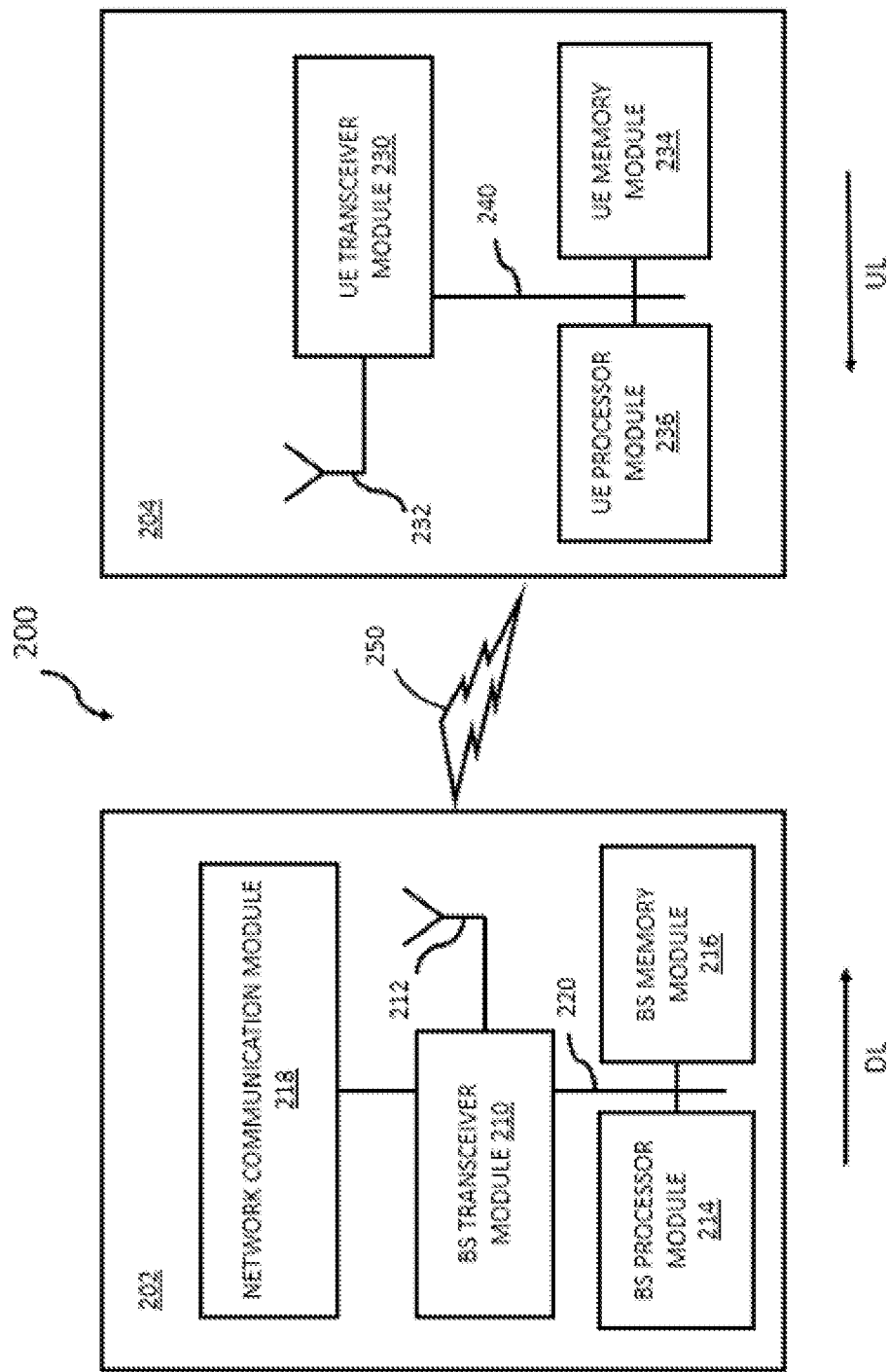
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Acquiring Channel State Information (CSI)

Wireless communication may enable exchange of data over a network environment. The 5th generation New Radio (5G NR) wireless communication network is designed based on Orthogonal Frequency Division Multiplex (OFDM) technology. The time-domain unit structure for wireless communication network transmission using OFDM technology forms a time slot with a certain number of OFDM symbols, and forms a wireless frame with a certain number of time slots. The frequency-domain unit structure for transmission is a certain number of subcarriers. A resource block (RB) may be formed. During the transmission process of the wireless communication network, the wireless communication system can formulate a transmission strategy according to Channel State Information (CSI). As the performance of wireless communication systems improves, so does the complexity.

The channel state information reference signal (CSI-RS) is transmitted through the antenna port and is carried on the channel state information reference signal resource. The channel state information reference signal resource may include a resource element group. The resource element group may include a certain number of resource elements, that is, a set of a certain number of resource elements (e.g., in time and in frequency). The channel state information reference signal transmitted through the antenna port may be code division multiplexed carried on a resource element group. The resource element group may be a code division multiplexing (CDM) group. Each code division multiplexing group may carry a channel state information reference signal of a certain number of antenna ports. Antenna ports in the same CDM group may be multiplexed on the same CDM group through different code sequences.

In some embodiments, a base station (e.g., BS 102) may determine configuration information. The base station may transmit configuration information to a terminal (e.g., UE 104). The base station may send a channel state information reference signal to the terminal, and receives a channel state information report sent by the terminal (e.g., UE 104). The channel state information reference signal may be transmitted via an antenna port of the base station, and may be carried on the channel state information reference signal resource. The antenna port may be mapped to a first type combination. The first type combination may be a combination of a CDM group and a code division multiplexed code sequence.

Combinations of different CDM groups and code division multiplexed code sequences may correspond to different antenna ports. Antenna ports may be identified by a combination of CDM group and code division multiplexed code sequences. For example, the number of CDM groups may be N and the number of code division multiplexed code sequences may be M, with N and M being positive integers. One way is that each time the code sequence multiplexing code sequence number changes by 1, the antenna port number changes by 1. Each time the CDM group sequence number changes by 1, the antenna port number may change by M. In some embodiments, the measurement error between the channel coefficients on the antenna ports may be introduced by the position difference of the CDM group. According to the mapping of the antenna port and the first type combination, the antenna port numbers corresponding to the same CDM group may be similar. With this, the measurement error between channel coefficients of ports in the same CDM group may be reduced. The measurement error between channel coefficients on adjacent antenna ports may be reduced, thereby bringing efficiency to the use of antenna ports and reducing the complexity of the system.

Table 1 below is an example, where the number of CDM groups is 4, and the number of code division multiplexed code sequences is 2:

| Antenna port | Combination of CDM group and code division multiplexed code sequence |
| --- | --- |
| Antenna port 0 | (CDM group 0, code sequence 0) |
| Antenna port 1 | (CDM group 0, code sequence 1) |
| Antenna port 2 | (CDM group 1, code sequence 0) |
| Antenna port 3 | (CDM group 1, code sequence 1) |
| Antenna port 4 | (CDM group 2, code sequence 0) |

-continued

| Antenna port | Combination of CDM group and code division multiplexed code sequence |
|---|---|
| Antenna port 5 | (CDM group 2, code sequence 1) |
| Antenna port 6 | (CDM group 3, code sequence 0) |
| Antenna port 7 | (CDM group 3, code sequence 1) |

The serial number of the antenna port is represented by p, the serial number of the CDM group is represented by j, and the serial number of the code division multiplexed code sequence is represented by s; the mapping relationship between the antenna port and the combination (CDM group, code division multiplexed code sequence):

$p = K + M \times j + s$ where K is a non-negative integer, "+" represents the operation relationship of addition, and "×" represents the operation relationship of multiplication.

For example, the number of CDM groups is N, and the number of code division multiplexed code sequences is M, with N and M being positive integers. One way is that each time the code division multiplexed code sequence number changes by 1, the antenna port number may change by N. Each time the CDM group number changes by 1, the antenna port number may change by 1. In some scenarios, the measurement error between the channel coefficients on the antenna ports may be introduced by the code sequence multiplexing code sequence difference. According to the mapping of the antenna port and the first type combination described above, the antenna port numbers corresponding to the same code division multiplexing code sequence may be similar. The measurement error between the channel coefficients of the ports of the same code division multiplexed code sequence can be reduced, lowering the measurement error between the channel coefficients of adjacent antenna ports. The use brings efficiency and reduces the complexity of the system.

Table 2 below is an example, where the number of CDM groups is 4, and the number of code division multiplexed code sequences is 2:

| Antenna port | Combination of CDM group and code division multiplexed code sequence |
|---|---|
| Antenna port 0 | (CDM group 0, code sequence 0) |
| Antenna port 1 | (CDM group 1, code sequence 0) |
| Antenna port 2 | (CDM group 2, code sequence 0) |
| Antenna port 3 | (CDM group 3, code sequence 0) |
| Antenna port 4 | (CDM group 0, code sequence 1) |
| Antenna port 5 | (CDM group 1, code sequence 1) |
| Antenna port 6 | (CDM group 2, code sequence 1) |
| Antenna port 7 | (CDM group 3, code sequence 1) |

The serial number of the antenna port is represented by p, the serial number of the CDM group is represented by j, and the serial number of the code division multiplexed code sequence is represented by s; the mapping relationship between the antenna port and the combination (CDM group, code division multiplexed code sequence):

$p = K + N \times s + j$ where K is a non-negative integer, "+" represents the operation relationship of addition, and "×" represents the operation relationship of multiplication.

The antenna port mapping to channel state information reference signal resource may be determined according to the resource block (number or identifier). Different resource blocks may correspond to different antenna ports, and antenna ports can be identified based on the resource blocks. In some embodiments, a one-to-one correspondence between resource blocks and antenna ports may be used. Table 3 below shows such an example:

| Resource Block (RB) Number | Antenna port number |
|---|---|
| 0 | Port 0 |
| 1 | Port 1 |
| 2 | Port 2 |
| 3 | Port 3 |

In some embodiments, one resource block may correspond to multiple antenna ports, and different resource blocks correspond to different antenna ports. Table 4 below is an example:

| RB number | Antenna port number | | | |
|---|---|---|---|---|
| 0 | Port 0 | Port 1 | Port 2 | Port 3 |
| 1 | Port 4 | Port 5 | Port 6 | Port 7 |
| 2 | Port 8 | Port 9 | Port 10 | Port 11 |
| 3 | Port 12 | Port 13 | Port 14 | Port 15 |

In some embodiments, resource blocks of one resource block group (RB group) correspond to antenna ports one by one, and different resource block groups may correspond to the same group of antenna ports. Table 5 below is an example:

| RB group number | RB number | Antenna port number |
|---|---|---|
| 0 | 0 | Port 0 |
|   | 1 | Port 1 |
|   | 2 | Port 2 |
|   | 3 | Port 3 |
| 1 | 4 | Port 0 |
|   | 5 | Port 1 |
|   | 6 | Port 2 |
|   | 7 | Port 3 |
| 2 | 8 | Port 0 |
|   | 9 | Port 1 |
|   | 10 | Port 2 |
|   | 11 | Port 3 |
| 3 | 12 | Port 0 |
|   | 13 | Port 1 |
|   | 14 | Port 2 |
|   | 15 | Port 3 |

In some embodiments, one resource block of one resource block group (RB group) may correspond to multiple antenna ports, different resource blocks in the same resource block group may correspond to different antenna ports, and different resource block groups may correspond to the same group of antennas port. Table 6 below is an example:

| RB group number | RB number | Antenna port number | | | |
|---|---|---|---|---|---|
| 0 | 0 | Port 0 | Port 1 | Port 2 | Port 3 |
|   | 1 | Port 4 | Port 5 | Port 6 | Port 7 |
|   | 2 | Port 8 | Port 9 | Port 10 | Port 11 |
|   | 3 | Port 12 | Port 13 | Port 14 | Port 15 |
| 1 | 0 | Port 0 | Port 1 | Port 2 | Port 3 |
|   | 1 | Port 4 | Port 5 | Port 6 | Port 7 |
|   | 2 | Port 8 | Port 9 | Port 10 | Port 11 |
|   | 3 | Port 12 | Port 13 | Port 14 | Port 15 |

-continued

| RB group number | RB number | Antenna port number | | | |
|---|---|---|---|---|---|
| 2 | 0 | Port 0 | Port 1 | Port 2 | Port 3 |
|   | 1 | Port 4 | Port 5 | Port 6 | Port 7 |
|   | 2 | Port 8 | Port 9 | Port 10 | Port 11 |
|   | 3 | Port 12 | Port 13 | Port 14 | Port 15 |
| 3 | 0 | Port 0 | Port 1 | Port 2 | Port 3 |
|   | 1 | Port 4 | Port 5 | Port 6 | Port 7 |
|   | 2 | Port 8 | Port 9 | Port 10 | Port 11 |
|   | 3 | Port 12 | Port 13 | Port 14 | Port 15 |

In some embodiments, the resource block group may be a set composed of resource blocks. Mapping of the antenna port to the channel state information reference signal resource may be based on a second type of combination The second type of combination may be a combination of a resource block, a CDM group, and a code division multiplexed code sequence, among others.

The combination of different resource blocks, CDM groups, and code division multiplexed code sequences correspond to different antenna ports. Not only may the antenna ports be identified by the combination of resource blocks, CDM group, and code division multiplexed code sequences, but also on the same channel state information reference signal resource usage situation, more antenna ports can be supported. The emergence of more channel state information reference signal resource usage due to supporting more antenna ports may be reduced, thereby avoiding increase in complexity of base stations and terminals. For example, the number of resource blocks is R, the number of CDM groups is N, and the number of code division multiplexed code sequences is M. Each time the resource block number changes by 1, the antenna port number changes by M×N, where R, N, and M are positive integers, "×" is a multiplication operation.

In some embodiments, every time the code sequence number of code division multiplexing changes by 1, the antenna port number may change by 1. Every time the CDM group number changes by 1, the antenna port number may change by M. Every time the resource block number changes by 1, the antenna port number may change by M×N, where "×" is a multiplication operation. In some scenarios, the measurement error between the channel coefficients on the antenna port may be mainly introduced by the position difference of the resource block. The measurement error between the channel coefficients on the antenna port may be secondarily introduced by the position difference of the CDM group. According to the mapping of the antenna port with the second type of combination, the antenna port numbers corresponding to the same CDM group in the same RB may be similar, so that adjacent antenna ports have measurement errors in the channel coefficients that are reduced. The reduction of measurement errors may bring efficiency to the use of the antenna port and reduces the complexity of the system.

Table 7 below is an example, where the number of resource blocks is 2, the number of CDM groups is 4, and the number of code division multiplexed code sequences is 2:

| Antenna port | Combination of resource block, CDM group and code division multiplexed code sequence |
|---|---|
| Antenna port 0 | (Resource block 0, CDM group 0, code sequence 0) |
| Antenna port 1 | (Resource block 0, CDM group 0, code sequence 1) |
| Antenna port 2 | (Resource block 0, CDM group 1, code sequence 0) |
| Antenna port 3 | (Resource block 0, CDM group 1, code sequence 1) |
| Antenna port 4 | (Resource block 0, CDM group 2, code sequence 0) |
| Antenna port 5 | (Resource block 0, CDM group 2, code sequence 1) |
| Antenna port 6 | (Resource block 0, CDM group 3, code sequence 0) |
| Antenna port 7 | (Resource block 0, CDM group 3, code sequence 1) |
| Antenna port 8 | (Resource block 1, CDM group 0, code sequence 0) |
| Antenna port 9 | (Resource block 1, CDM group 0, code sequence 1) |
| Antenna port 10 | (Resource block 1, CDM group 1, code sequence 0) |
| Antenna port 11 | (Resource block 1, CDM group 1, code sequence 1) |
| Antenna port 12 | (Resource block 1, CDM group 2, code sequence 0) |
| Antenna port 13 | (Resource block 1, CDM group 2, code sequence 1) |
| Antenna port 14 | (Resource block 1, CDM group 3, code sequence 0) |
| Antenna port 15 | (Resource block 1, CDM group 3, code sequence 1) |

The following relation is another example: the serial number of the antenna port is represented by p, the serial number of the resource block is represented by r, the serial number of the CDM group is represented by j, and the serial number of the code division multiplexed code sequence is represented by s; (Resource block, CDM group, code division multiplexed code sequence):

$$p = K + M \times N \times r + M \times j + s$$

where K is a non-negative integer, "+" indicates the operation relationship of addition, and "×" indicates the operation relationship of multiplication.

In some embodiments, each time the code division multiplexing code sequence number is changed by 1, the antenna port number may be changed by N×R where "×" is a multiplication operation. Every time the CDM group number is changed by 1, the antenna port number may be changed by R. Every time the resource block number is changed by 1, the antenna port number may be changed by 1.

In some embodiments, the measurement error between the channel coefficients on the antenna ports may be mainly introduced by the code sequence multiplexing code sequence difference. The measurement error between the channel coefficients on the antenna port may be secondly introduced by the CDM group position difference. According to the mapping of the antenna port and the second type combination, the antenna port numbers of the same CDM group in the same code division multiplexed code sequence may be similar, so that the measurement error between the channel coefficients on adjacent antenna ports is reduced. The reduction may bring efficiency to the use of the antenna ports and reducing the complexity of the system.

Table 8 below is an example, where the number of resource blocks is 2, the number of CDM groups is 4, and the number of code division multiplexed code sequences is 2:

| Antenna port | Combination of resource block, CDM group and code division multiplexed code sequence |
|---|---|
| Antenna port 0 | (Resource block 0, CDM group 0, code sequence 0) |
| Antenna port 1 | (Resource block 1, CDM group 0, code sequence 0) |
| Antenna port 2 | (Resource block 0, CDM group 1, code sequence 0) |
| Antenna port 3 | (Resource block 1, CDM group 1, code sequence 0) |
| Antenna port 4 | (Resource block 0, CDM group 2, code sequence 0) |
| Antenna port 5 | (Resource block 1, CDM group 2, code sequence 0) |
| Antenna port 6 | (Resource block 0, CDM group 3, code sequence 0) |
| Antenna port 7 | (Resource block 1, CDM group 3, code sequence 0) |

-continued

| Antenna port | Combination of resource block, CDM group and code division multiplexed code sequence |
|---|---|
| Antenna port 8 | (Resource block 0, CDM group 0, code sequence 1) |
| Antenna port 9 | (Resource block 1, CDM group 0, code sequence 1) |
| Antenna port 10 | (Resource block 0, CDM group 1, code sequence 1) |
| Antenna port 11 | (Resource block 1, CDM group 1, code sequence 1) |
| Antenna port 12 | (Resource block 0, CDM group 2, code sequence 1) |
| Antenna port 13 | (Resource block 1, CDM group 2, code sequence 1) |
| Antenna port 14 | (Resource block 0, CDM group 3, code sequence 1) |
| Antenna port 15 | (Resource block 1, CDM group 3, code sequence 1) |

In some embodiments, a serial number of the antenna port is represented by p, the serial number of the resource block is represented by r, the serial number of the CDM group is represented by j, and the serial number of the code division multiplexed code sequence is represented by s; antenna port and combination (Resource block, CDM group, code division multiplexed code sequence):

$$p = K + r + N \times R \times s + R \times j$$

where K is a non-negative integer, "+" indicates the operation relationship of addition, and "×" indicates the operation relationship of multiplication.

In some embodiments, precoding of the antenna port, and the mapping of the antenna port to the channel state information reference signal resource may be determined according to the type of codebook used to report the precoding of the antenna port. The mapping of the antenna port to the channel state information reference signal resource may be determined according to the type of codebook used to report the precoding of the antenna port. This codebook type based matching to reduce the complexity of the way the system may use the mapping of the antenna port to the channel state information reference signal resource and the codebook type used to report the precoding of the antenna port.

The mapping of an antenna port to the channel state information reference signal resource may be determined according to the type of codebook used for reporting the precoding of the antenna port. Table 9 below is an example of the mapping of antenna port to channel state information reference signal resource and reporting the precoding of the antenna port, or one-to-one mapping of codebook types:

| Mapping method from antenna port to channel state information reference signal resource | the codebook type used for reporting the precoding of the antenna port |
|---|---|
| Mapping method 0 | Codebook type 0 |
| Mapping method 1 | Codebook type 1 |
| Mapping method 2 | Codebook type 2 |

In some embodiments, mapping of the antenna port to the channel state information reference signal resource may be determined according to the codebook type used to report the precoding of the antenna port. As enumerated in Table 10 below, the mapping of the antenna port to the channel state information reference signal resource may corresponds to one or more types of codebook used to report precoding of the antenna port:

| Mapping method from antenna port to channel state information reference signal resource | the codebook type used for reporting the precoding of the antenna port |
|---|---|
| Mapping method 0 | Codebook type 0 |
| Mapping method 1 | Codebook type 1 |
|  | Codebook type 2 |
| Mapping method 2 | Codebook type 3 |
|  | Codebook type 4 |
|  | Codebook type 5 |

In some embodiments, the configuration information may include the number of ports of the channel state information reference signal resource, and the actual number of antenna ports transmitting the channel state information reference signal. The number of ports of the channel state information reference signal resource may be the maximum number of antenna ports that the channel state information reference signal resource can carry. In the communication system, the set of the number of ports of the channel state information reference signal resource may be a discrete positive integer, rather than continuous. For example, the set of the number of ports of the channel state information reference signal resource is {1, 2, 4, 6, 8, 12, 16, 24, 32}. In some embodiments, the number of antenna ports transmitting the channel state information reference signal may not be the number of ports of the channel state information reference signal resource. The number of antenna ports may be the maximum number of antenna ports that the channel state information reference signal resource can carry. For example, the transmission channel state information reference signal may require the number of antenna ports to be 18, and 18 is not an element in the above set.

Correspondingly, the configuration information may define or include the actual number of antenna ports for transmitting channel state information reference signals to avoid the terminal from selecting more antenna ports for processing than the number of antenna ports for transmitting channel state information reference signals, thereby reducing complexity. In addition, it is also possible to avoid selecting an antenna port that does not transmit a channel state information reference signal, and to avoid introducing noise or interference from an antenna port that does not transmit a channel state information reference signal. An example is as follows. In the configuration information, the number of ports of the channel state information reference signal resource may be 24 and the actual number of antenna ports transmitting the channel state information reference signal may be 18. That is, the maximum number of antenna ports that the channel state information reference signal resource can carry may be 24. The transmission channel state information reference signal may use 18 of these ports.

In some embodiments, the configuration information may define or include a number of ports of (allocate, configured and/or available for) the channel state information reference signal resource, and the actual antenna port number (used in transmission) of the channel state information reference signal. The number of ports of the channel state information reference signal resource may be the maximum number of antenna ports that the channel state information reference signal resource can carry. The number of antenna ports transmitting the channel state information reference signal may not be exactly the number of ports of the channel state information reference signal resource.

In some embodiments, The configuration information may define or include the antenna port number of the transmission channel state information reference signal that can prevent the terminal from processing the antenna port without the transmission channel state information reference signal, thereby reducing the complexity of the terminal. For example, in the configuration information, the number of ports of the channel state information reference signal resource may be 24, the antenna port transmitting the channel state information reference signal may be the first 18 ports, or the port serial number may be 0 to 17. In another example, when the channel state information is transmitted, the antenna ports of the reference signals may be the last 18 ports, or the serial numbers of the ports may be 7 to 23. In another example, the antenna port numbers of the reference signals for transmitting the channel state information may be 0 to 8 and 12 to 20. For another example, in the configuration information, the number of ports of the channel state information reference signal resource may be 32, and the antenna port transmitting the channel state information reference signal may be the first 28 ports, or the port number is 0 to 27. In another example, in the transmission channel state, the antenna ports of the information reference signals may be the last 28 ports, or the port numbers may be 4 to 31. In another example, the antenna port numbers of the transmission channel state information reference signals may be 0 to 13 and 16 to 31.

In some embodiments, the channel state information report may include precoding of antenna ports. The precoding may be a linear combination of antenna port corresponding vectors, and the configuration information may include the maximum number of antenna ports in the precoding. The antenna port may correspond to the antenna port vector one-to-one, and the channel state information report may include the antenna port reported by the terminal. The antenna port reported by the terminal may be equivalent to the report including the vector corresponding to the antenna port. The configuration information may define or include the maximum number of antenna ports in the precoding, which can prevent the terminal from processing too many antenna ports and avoid feedback of too many antenna ports and coefficients in linear combinations, thereby reducing the complexity of the system. For example, the configuration information may include that the maximum number of antenna ports in the precoding is 8, and the precoding of the antenna ports included in the channel state information report may be a linear combination of the corresponding vectors of antenna ports of less than or equal to 8. The report may include less than or equal to 8 antenna ports, and the coefficient in the linear combination may correspond to the number of antenna ports. For example, the configuration information may include that the maximum number of antenna ports in the precoding is 6, and the precoding of the antenna ports included in the channel state information report may be a linear combination of the corresponding vector of antenna ports whose number is less than or equal to 6. The report may include less than or equal to 6 antenna ports, and the coefficient in the linear combination may correspond to the number of antenna ports.

In some embodiments, the channel state information report may include a first antenna port set. The antenna ports in the precoding may be or include elements in the first antenna port set. The number of elements in the first antenna port set may be less than or equal to the channel state information resource signal's resource's ports. With reference to the number of signal resource ports, the number of elements in the first antenna port set may be less than or equal to the maximum number of antenna ports in the precoding of the configuration information. The terminal (e.g., the UE 104) can use the report to select particular antenna ports of the base station (e.g., BS 102).

The terminal can further reduce the number of antenna ports fed back in the report, thereby reducing the processing of too many antenna ports, reducing the coefficient of the corresponding vectors of the too many antenna ports, thereby reducing the complexity of the terminal. For example, the number of ports of the channel state information reference signal resource may be 16, the maximum number of antenna ports in the precoding of the configuration information may be 8, and the first antenna port set included in the report may be the antenna port {1, 3, 4, 7}. The terminal may process the antenna port {1, 3, 4, 7}, and feedback the coefficient value corresponding to the antenna port {1, 3, 4, 7}. In another example, the number of ports of the channel state information reference signal resource may be 32, the maximum number of antenna ports in the precoding of the configuration information may be 12, and the first antenna port set included in the report may be antenna port {0, 2, 5, 13, 16, 18, 27, 29}. The terminal may process the antenna port {0, 2, 5, 13, 16, 18, 27, 29} and the corresponding antenna port {0, 2, 5, 13, 16, 18, 27, 29}.

In some embodiments, the channel state information report may include a second antenna port set, the second antenna port set may be a subset of the first antenna port set, and the second antenna port set may include antenna ports of one of a plurality of layers in the precoding. It should be noted that the precoding may have multiple layers, for example, one layer, or two layers, or three layers, or four layers, or more layers. The precoding of each layer may be different, and the antenna port of each layer of precoding may be different. The channel status information report may include the second antenna port set, that is, the set of antenna ports of a certain layer. The coefficients of all ports under the first antenna port set may not be fed back to this layer, but coefficients of ports in the second antenna port set. The processing antenna ports that exceed the second antenna port set may be avoided and feedback that exceeds antenna port coefficients of the second antenna port set may be avoided. For example, the number of ports of the channel state information reference signal resource may be 16, the maximum number of antenna ports in the precoding of the configuration information may be 8. The first antenna port set included in the report may be the antenna port {1, 3, 4, 7}. The precoded layer 1 antenna port set may be {1, 3, 7} and the precoded layer 2 antenna port set may be {4, 7}. For example, the number of ports of the channel state information reference signal resource may be 32, the maximum number of antenna ports in the precoding of the configuration information may be 12, and the first antenna port set included in the report may be antenna port {0, 2, 5, 13, 16, 18, 27, 29}; the precoded layer 1 antenna port set may be {2, 5, 18, 27}, and the precoded layer 2 antenna port set may be {0, 13, 16, 29}, the precoded layer 3 antenna port set may be {0, 2, 16, 18}, and the precoded layer 4 antenna port set may be {2, 13, 18, 29}.

In some embodiments, the channel state information report may include precoding of the antenna port. The precoding may be a linear combination of the corresponding vector of the antenna port. The configuration information may define or include the sequence number range of the antenna port in the precoding. For example, the number of ports of the channel state information reference signal resource may be 16. The configuration information may include the sequence number of the antenna ports in the precoding that may be the antenna port {1, 3, 4, 7}. The terminal may process the antenna port {1, 3, 4, 7}, and feedback the coefficient corresponding to the antenna port {1, 3, 4, 7}. For example, the number of ports of the channel state information reference signal resource may be 32. The configuration information may include the sequence number of the antenna port in the precoding that is the antenna port {0, 2, 5, 13, 16, 18, 27, 29}. The terminal may process the antenna port {0, 2, 5, 13, 16, 18, 27, 29} and feedback the coefficient value corresponding to the antenna port {0, 2, 5, 13, 16, 18, 27, 29}.

In some embodiments, the configuration information may include the serial number range of the antenna ports in a precoded layer. For example, the number of ports of the channel state information reference signal resource is 16, and the configuration information includes the serial number range of the antenna port of the precoded layer 1 is {1, 3, 7}, and the serial number range of the antenna port of the precoded layer 2 is {4, 7}. Another example is as follows, the number of ports of the channel state information reference signal resource is 32, and the configuration information includes the serial number range of the antenna port of the precoded layer 1 is {2, 5, 18, 27}, the serial number range of the antenna port of the precoded layer 2 is {0, 13, 16, 29}, the serial number range of the antenna port of the precoded layer 3 is {0, 2, 16, 18}, and the serial number range of the antenna port of the precoded layer 4 is {2, 13, 18, 29}.

In some embodiments, the channel state information report may include precoding of an antenna port. The configuration information may include a type of the precoding report, and the type of the precoding report is one of the following types:

1st precoding report type: wideband type;
2nd precoding report type: subband type; and
3rd precoding report type: neither wideband type nor subband type.

It should be noted that the configuration information may include the type of the precoding report, and may indicate a report type used by the terminal to report the precoding. The above-mentioned type of wideband may indicate that one reported precoding is applicable to the bandwidth corresponding to the entire channel state and consumes less reporting resource overhead. The subband type may indicate that one precoding is applicable to one subband. The one subband may be a band of a certain number of resource blocks, and may be a part of the bandwidth corresponding to the entire channel state. The subband type may occupy more reporting resource overhead. The other type may be neither wideband type nor subband type. The precoding applicable to each subband can be obtained from the precoding reported in this type. Each subband of the bandwidth may correspond to the precoding applicable to each subband by one-to-one. This type of reporting resource overhead may be relatively small compared to the subband type, and may be more expensive than the wideband type. For example, the configuration information may indicate a type of a precoding report explicitly. In another example, the configuration information may indicate the type of the precoding report implicitly. For example, it may be indicated by a configured codebook type. For example, the report may include a port used for precoding to indicate that the precoding report type is the third report type.

In some embodiments, there may be no binding relationship between resource block groups in the channel state information reference signal resource. The binding relationship may include or refer to one of the following: channel coefficients of adjacent resource block groups are expected to be continuous; and channel state information reference signals are expected to use the same precoding vector on adjacent resource block groups. It should be noted that, in some scenarios, the channel state information reference signal may use different precoding vectors on adjacent resource block groups. Therefore, the channel state information reference signal may not be expected to use the same precoding vectors. That is, treating according to not using the same precoding vector can reduce the complexity of the system, and avoid introducing interference on adjacent resource block groups. The channel coefficients of adjacent resource block groups may not be expected to be continuous. The processing may be performed in a manner that the channel coefficients of adjacent resource block groups are not continuous. The complexity of the system may be reduced and introducing interference on adjacent resource block groups may be avoided.

For example, the configuration information may indicate that there is no binding relationship between resource block groups within the channel state information reference signal resource. In another example, it may be determined that there is no binding relationship between resource block groups in the channel state information reference signal resource according to the type of the precoding report. For example, the third precoding report type may indicate that there is no binding relationship between resource block groups in the channel state information reference signal resource, and the third precoding report type may be neither a wideband type nor a subband type. For example, there may be no binding relationship between resource block groups within the channel state information reference signal resource specified by the protocol.

In some embodiments, the channel state information report may include precoding of antenna ports. The precoding may be a linear combination of antenna port corresponding vectors and the configuration information may indicate whether the report includes the amplitude of the coefficients of corresponding vectors of the antenna ports.

In some embodiments, the base station may obtain the amplitude information of the antenna port corresponding vector from the uplink channel. In some embodiments, the base station may not obtain the amplitude information of the antenna port corresponding vector from the uplink channel. The configuration information may indicate whether the amplitude of the coefficient of the antenna port corresponding vector is included in the report, which can reduce the complexity of the terminal. For example, the configuration information may indicate explicitly whether the report includes an amplitude of a coefficient value of an antenna port corresponding vector. In another example, the configuration information may indicate implicitly whether the report includes the amplitude of the coefficient of the antenna port corresponding vector. For example, the configuration information may include a sounding reference signal (SRS) indicating that the report includes the coefficient of the antenna port corresponding vector, the amplitude of the value. For example, the configuration information may not include a sounding reference signal (SRS), indicating that the amplitude of the coefficient of the corresponding vector of the antenna port is not included in the report.

In some embodiments, the channel state information report may include precoding of the antenna ports. The precoding may be a linear combination of the antenna ports' corresponding vectors. The amplitude of the coefficient of the antenna port corresponding vector may be omitted. The omission triggered by the state of the resource (e.g., large or small size) used in the transmission of the CSI report.

It should be noted that, in some scenarios, the base station may obtain the amplitude information of the corresponding vector of the antenna port from the uplink channel. However, because of the difference between the uplink and downlink channels, the obtained amplitude information may not accurate enough. The amplitude of the coefficients of the corresponding vectors of the antenna ports may be omitted, which is triggered by the state of the resource used in transmission of the report and can improve the accuracy of the feedback precoding as much as possible and reduce the complexity of the system. For example, the omission may be triggered by the amount of resources used in the transmission of the report. In another example, the omission may be triggered by the code or bit rate of the resource used for the transmission of the report.

In some embodiments, the channel state information report may include precoding of the antenna port, the precoding is a linear combination of the corresponding vector of the antenna ports; a phase of the coefficient of the vectors is reported according to a frequency domain interval, The amplitude of the coefficient may be reported according to a bandwidth corresponding to the entire channel state. The frequency domain interval may be a part of the bandwidth corresponding to the entire channel state.

It should be noted that the amplitude of the vector may not change much in the bandwidth corresponding to the entire channel state, and the phase of the vector may vary greatly with different frequency domain intervals. Therefore, the phase of the coefficient of the vector may be reported in the frequency domain interval, and the amplitude of the coefficient of the vector may be reported in the bandwidth corresponding to the entire channel state. The reported resource overhead can be reduced while improving the accuracy of the reported precoding, thereby reducing the complexity of the system.

Figure 3:
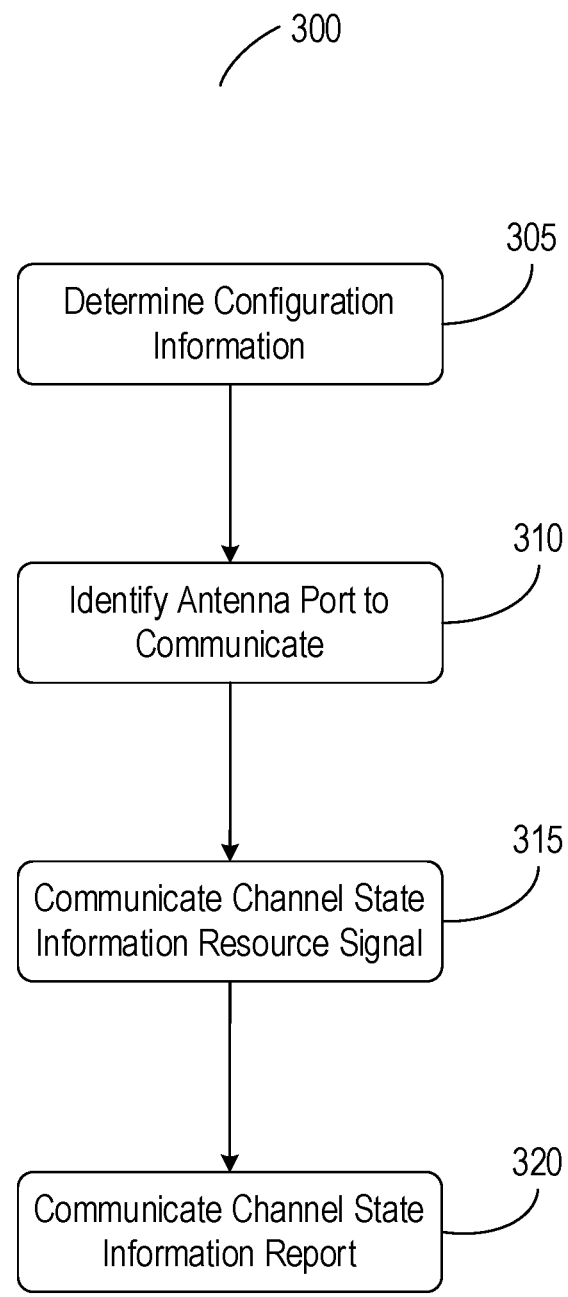
FIG. 3 illustrates a flow diagram of an example method of acquiring channel state information, in accordance with an embodiment of the present disclosure.

Referring now to FIG. 3, depicted is a method 300 of acquiring channel state information. The method 300 may be performed using the components described herein, such as those detailed in conjunction with FIGS. 1 and 2. In brief overview, the method 300 may include determining configuration information (305). The method 300 may include identifying an antenna port to communicate (310). The method 300 may include communicating channel state information resource signal (315). The method 300 may include communicating channel state information report (320).

In further detail, the method 300 may include determining configuration information (300). A wireless communication node (e.g., the BS 102) may send, provide, or otherwise transmit configuration information to a wireless communication device (e.g., UE 104). The configuration information may define or include specifications for the exchanging of channel state information reference signals (CSI-RS) or the channel state information (CSI) report. The wireless communication device in turn may receive the configuration information from the wireless communication node. In some embodiments, the configuration information may define, indicate, or include a maximum number of the antenna ports that a resource of the CSI-RS can carry. In some embodiments, the configuration information may define, indicate, or include an actual number of the antenna ports for transmitting the CSI-RS. In some embodiments, the configuration information may define, indicate, or include an identification of an antenna port via which to communicate the CSI-RS. In some embodiments, the configuration information may define, indicate, or include a range of sequence numbers of antenna ports in a precoding. The precoding may specify which antenna ports are to be used in communicating the CSI-RS or the CSI report.

In some embodiments, the configuration information may define, indicate, or include a type of reporting to report a precoding. The type of recording may define, identify, or include a wideband type, a sub-band type, a type different from wideband type and the sub-band type. The wideband type may indicate which reported precoding is applicable to the bandwidth corresponding to the entire channel state and consumes less reporting resource overhead. The sub-band type may indicate which one precoding is applicable to one sub-band. In some embodiments, the configuration information may define, identify, or indicate whether the CSI-RS report includes a amplitude of coefficients of vectors corresponding to antenna ports in a precoding. The amplitude of coefficient vectors may specify a value of coefficients to be applied on the antenna port in transmitting in accordance with the precoding.

The method 300 may include identifying an antenna port to communicate (310) The wireless communication node (e.g., BS 104) may identify an antenna port from a plurality of antenna ports to which to communicate with a wireless communication device (e.g., UE 104). The antenna ports may correspond to resource (e.g., time and frequency band) over which a specific set of reference signals are communicated in a DL transmission. Each antenna port may be defined such that a channel over which a symbol on the antenna port is conveyed can be inferred from the channel over which another symbol on the same antenna port is conveyed. In some embodiments, the antenna port from the plurality of antenna ports may be determined, selected, or otherwise identified according to a code division multiplexed (CDM) group and a CDM code sequence for transmitting a channel state information reference signal (CSI-RS) (e.g., Table 2). The CDM group for transmitting CSI-RS may define or correspond to a set of resource elements. The CDM code sequence for transmitting CSI-RS may define or correspond to orthogonal code sequences over a CDM group.

In some embodiments, the antenna port from the plurality of antenna ports may be determined, selected, or otherwise identified according to an identification of a resource block (RB) for transmitting the CSI-RS (e.g., Tables 3-6). The identification of the RB (e.g., an RB number) may define a specification of antenna port numbers for a particular resource block number. In some embodiments, the antenna port from the plurality of antenna ports may be determined, selected, or otherwise identified according to the identification of a resource block, the code division multiplexed (CDM) group and the CDM code sequence for transmitting the CSI-RS (e.g., Tables 7 and 8). In some embodiments, the antenna port from the plurality of antenna ports may be determined, selected, or otherwise identified according to a type of codebook used to report precoding information of the antenna port (e.g., Tables 9 and 10). The type of codebook may reference the codebook with which the precoding of the antenna port is to be reported.

The method 300 may include communicating channel state information resource signal (315). The wireless communication node (e.g., BS 102) may send, provide, transmit the channel state information reference signal (CSI-RS) to the wireless communication device (e.g., UE 104). The CSI-RS may be transmitted via the antenna port of the plurality of antenna ports of the wireless communication node. The antenna port may be identified from the plurality of antenna ports of the wireless communication node as detailed herein above. The CSI-RS may be signal containing information with which the communication system can formulate a transmission strategy. The transmission of the CSI-RS by the wireless communication node may be in response to identification of the antenna port from the plurality of antenna ports. In turn, the wireless communication device may receive the CSI-RS from the wireless communication node. The CSI-RS may be received via the antenna port of the plurality of antenna ports of the wireless communication node. In some embodiments, there may be an absence of a binding relationship between resource groups in the CSI-RS. The binding relationship may define, identify, or include channel coefficients of adjacent resource block groups that are expected to be continuous. A channel coefficient may identify or correspond to a value to be applied on the antenna ports in the resource block in CSI-RS transmissions. The binding relationship may also define, identify, or include the CSI-RS that is expected to use a same precoding vector on adjacent resource block groups.

The method 300 may include communicating channel state information report (320). The wireless communication device (e.g., UE 102) may send, provide, or transmit the channel state information (CSI) report to the wireless communication node (e.g., BS 104). The wireless communication node in turn may identify, retrieve, or receive the CSI report from the wireless communicate device. The CSI report may include precoding on the antenna ports. The antenna ports may correspond to those identified from the plurality of antenna ports of the wireless communication node in communicating the CSI-RS. In some embodiments, the CSI-RS report may define, indicate, or include information about the precoding of antenna ports. The precoding may include a linear combination of vectors corresponding to the antenna ports. The linear combination may include a coefficient-weighted summation of vectors corresponding to the antenna ports. In some embodiments, the CSI-RS may include a phase of coefficients of vectors reporting according to an interval in a frequency domain. The phase of coefficients may define or indicate an angle of vectors within a defined interval within the frequency domain. In some embodiments, a amplitude of the coefficients may be reported according to a bandwidth corresponding to an entire channel state. The entire channel state may define or correspond to a subband in frequency and time. In some embodiments, the interval in the frequency domain may be a portion of the bandwidth corresponding to the entire channel state.

In some embodiments, a state of resources used in the transmitting of the CSI-RS report may trigger omission from the CSI-RS report of a amplitude of coefficients of the vectors corresponding to the antenna ports in the precoding. The state of resources may correspond to a data size of the transmissions in the CSI RS report. In some embodiments, the wireless communication device may compare a data size to a threshold level. The threshold level may define a value of the data size at which to trigger the omission. If the data size satisfies the threshold level (e.g., lower than or higher than), the wireless communication device may omit the amplitude of coefficients of the vectors corresponding to the antenna ports in the precoding from the CSI-RS report. Otherwise, if the data size does not satisfy the threshold level, the wireless communication device may include the amplitude of coefficients of the vectors corresponding to the antenna ports in the precoding in the CSI-RS report.

In some embodiments, the CSI-RS report may define, indicate, or include a subset of antenna ports as elements. The elements may correspond to or include antenna ports in the precoding. In some embodiments, a number of elements may be less than or equal to the maximum number of antenna ports that a CSI-RS can carry. The maximum number may be defined by the configuration information communicated by the wireless communication node. The number of elements may also be less than or equal to the maximum number of the antenna ports in the precoding. The precoding may be included or defined by the configuration information provided by the wireless communication node. In some embodiments, the CSI-RS report may identify, define, or include a subset of a first subset of antenna elements. The first subset may include antenna ports of at least one of a plurality of layers in the precoding. The layers may correspond to the MIMO layers.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method, comprising: transmitting, by a wireless communication node, a channel state information reference signal (CSI-RS) to a wireless communication device via a subset of antenna ports identified from a plurality of antenna ports of the wireless communication node; and receiving, by the wireless communication node, a channel state information (CSI) report on the subset of antenna ports from the wireless communication device, the CSI report including precoding information of the subset of antenna ports, wherein the subset of antenna ports is identified from the plurality of antenna ports according to a type of codebook used to report the precoding information of the subset of antenna ports.

2. The method of claim 1, wherein the subset of antenna ports is identified from the plurality of antenna ports according to a code division multiplexed (CDM) group and a CDM code sequence for transmitting the CSI-RS.

3. The method of claim 1, wherein the subset of antenna ports is identified from the plurality of antenna ports according to an identification of a resource block for transmitting the CSI-RS.

4. The method of claim 1, wherein the subset of antenna ports is identified from the plurality of antenna ports according to an identification of a resource block, a code division multiplexed (CDM) group and a CDM code sequence for transmitting the CSI-RS.

5. The method of claim 1, further comprising: transmitting, by the wireless communication node, configuration information to the wireless communication device, the configuration information including a maximum number of the antenna ports that a resource of the CSI-RS can carry, and an actual number of the antenna ports for transmitting the CSI-RS.

6. The method of claim 1, further comprising: transmitting, by the wireless communication node, configuration information to the wireless communication device, the configuration information including a maximum number of the antenna ports that a resource of the CSI-RS can carry, and an identification of the subset of antenna ports.

7. The method of claim 1, further comprising: transmitting, by the wireless communication node, configuration information to the wireless communication device; wherein the CSI-RS report includes information about a precoding of the antenna ports, the precoding comprising a linear combination of vectors corresponding to the antenna ports, the configuration information including a maximum number of the antenna ports in the precoding.

8. The method of claim 1, further comprising: transmitting, by the wireless communication node, configuration information to the wireless communication device; wherein the CSI-RS report includes the subset of antenna ports as elements, the elements comprising antenna ports in a precoding; the configuration information including a maximum number of the antenna ports in the precoding; wherein a number of the elements is less than or equal to a maximum number of the antenna ports that a resource of the CSI-RS can carry, and is less than or equal to the maximum number of the antenna ports in the precoding that is included in the configuration information.

9. The method of claim 8, wherein the CSI-RS report includes a subset of the subset of antenna elements comprising antenna ports of one of a plurality of layers of the precoding.

10. The method of claim 1, further comprising: transmitting, by the wireless communication node, configuration information to the wireless communication device, the configuration information including a range of sequence numbers of antenna ports in a precoding, wherein the CSI-RS report includes information about the precoding, the precoding comprising a linear combination of vectors corresponding to the antenna ports in the precoding.

11. The method of claim 1, further comprising: transmitting, by the wireless communication node, configuration information to the wireless communication device, the configuration information including a type of reporting to report a precoding, comprising a wideband type, a subband type, or a type different from the wideband type and the subband type.

12. The method of claim 1, wherein there is an absence of a binding relationship between resource block groups in the CSI-RS, the binding relationship comprising: channel coefficients of adjacent ones of the resource block groups are expected to be continuous; or the CSI-RS is expected to use a same precoding vector on adjacent ones of the resource block groups.

13. The method of claim 1, further comprising: transmitting, by the wireless communication node, configuration information to the wireless communication device, the configuration information indicating whether the CSI-RS report includes an amplitude of coefficients of vectors corresponding to antenna ports in a precoding, wherein the CSI-RS report includes information about the precoding, the precoding comprising a linear combination of the vectors corresponding to the antenna ports in the precoding.

14. The method of claim 1, wherein the CSI-RS report includes information about the precoding, the precoding comprising a linear combination of vectors corresponding to antenna ports in the precoding, wherein a state of resources used in the transmitting of the CSI-RS report triggers omission from the CSI-RS report of an amplitude of coefficients of the vectors corresponding to the antenna ports in the precoding.

15. The method of claim 1, wherein the CSI-RS report includes information about the precoding, the precoding comprising a linear combination of vectors corresponding to antenna ports in the precoding, and includes a phase of coefficients of the vectors reported according to an interval in a frequency domain, wherein a amplitude of the coefficients is reported according to a bandwidth corresponding to an entire channel state, and the interval in the frequency domain is a portion of the bandwidth corresponding to the entire channel state.

16. A method, comprising: receiving, by a wireless communication device, a channel state information reference signal (CSI-RS) from a wireless communication node via a subset of antenna ports identified from a plurality of antenna ports of the wireless communication node; and transmitting, by the wireless communication device, a channel state information (CSI) report on the subset of antenna ports from the wireless communication device, the CSI report including precoding information of the subset of antenna ports, wherein the subset of antenna ports is identified from the plurality of antenna ports according to a type of codebook used to report the precoding information of the subset of antenna ports.

17. The method of claim 16, wherein the subset of antenna ports is identified from the plurality of antenna ports according to a code division multiplexed (CDM) group and a CDM code sequence for transmitting the CSI-RS.

18. A wireless communication node, comprising: at least one processor configured to: transmit, via a transceiver, a channel state information reference signal (CSI-RS) to a wireless communication device via a subset of antenna ports identified from a plurality of antenna ports of the wireless communication node; and receive, via the transceiver, a channel state information (CSI) report on the subset of antenna ports from the wireless communication device, the CSI report including precoding information of the subset of antenna ports, wherein the subset of antenna ports is identified from the plurality of antenna ports according to a type of codebook used to report the precoding information of the subset of antenna ports.

19. A wireless communication device, comprising: at least one processor configured to: receive, via a transceiver, a channel state information reference signal (CSI-RS) from a wireless communication node via a subset of antenna ports identified from a plurality of antenna ports of the wireless communication node; and transmit, via the transceiver, a channel state information (CSI) report on the subset of antenna ports from the wireless communication device, the CSI report including precoding information of the subset of antenna ports, wherein the subset of antenna ports is identified from the plurality of antenna ports according to a type of codebook used to report the precoding information of the subset of antenna ports.

* * * * *